United States Patent
Hanaka (10) Patent No.: US 9,729,100 B2
(45) Date of Patent: Aug. 8, 2017

(54) MOBILE BODY AND MOBILE BODY SYSTEM

(71) Applicant: Murata Machinery, Ltd., Kyoto-shi, Kyoto (JP)

(72) Inventor: Satoshi Hanaka, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 15/222,160

(22) Filed: Jul. 28, 2016

(65) Prior Publication Data
US 2017/0054398 A1    Feb. 23, 2017

(30) Foreign Application Priority Data

Aug. 21, 2015 (JP) .................. 2015-163943

(51) Int. Cl.
| | |
|---|---|
| H02K 41/02 | (2006.01) |
| H02P 25/06 | (2016.01) |
| G01D 5/14 | (2006.01) |
| H02K 11/215 | (2016.01) |

(52) U.S. Cl.
CPC ............. *H02P 25/06* (2013.01); *G01D 5/145* (2013.01); *H02K 11/215* (2016.01); *H02K 41/02* (2013.01)

(58) Field of Classification Search
CPC ...... G05B 11/01; H02K 41/02; H02K 41/025; H02K 21/00; H02K 21/14; H02K 29/06; H02K 29/08; H02P 6/00; H02P 6/14; H02P 21/00

USPC ......... 318/119, 135, 400.01, 400.02, 400.38, 318/400.4, 400.14, 700, 701, 727, 779, 318/799, 800, 801, 430, 432, 437; 388/800, 901, 909, 931; 324/207.23, 324/207.24, 207.13
See application file for complete search history.

(56) References Cited

U.S. PATENT DOCUMENTS

| | | | |
|---|---|---|---|
| 6,876,170 B2 * | 4/2005 | Okita ...................... | H02P 6/16 318/700 |
| 2016/0072367 A1 | 3/2016 | Yamada et al. | |

FOREIGN PATENT DOCUMENTS

JP      2010-256169 A     11/2010

* cited by examiner

*Primary Examiner* — Antony M Paul
(74) *Attorney, Agent, or Firm* — DLA Piper LLP (US)

(57) ABSTRACT

A mobile body moves along a magnetic pole path having a magnetic pole section and a magnetic pole missing section. The mobile body includes a plurality of linear motors, a first detector, a second detector, and an estimator. The plurality of linear motors include a first linear motor. The first detector is disposed on one side with respect to the first linear motor in the path direction of the magnetic pole path, and detects a first phase angle. The second detector is disposed on the other side with respect to the first linear motor in the path direction of the magnetic pole path, and detects a second phase angle. The estimator compares a phase difference between the first phase angle and the second phase angle with a reference phase difference, to estimate whether or not the first linear motor is located in the magnetic pole missing section.

14 Claims, 3 Drawing Sheets

MOBILE BODY AND MOBILE BODY SYSTEM

CROSS-REFERENCE TO RELATED APPLICATIONS

This application claims priority under 35 U.S.C. 119 to Japanese Patent Application No. 2015-163943, filed on Aug. 21, 2015, which application is hereby incorporated by reference in its entirety.

BACKGROUND OF THE INVENTION

1. Field of the Invention

The present invention relates to a mobile body that moves along a movement path in which a plurality of pairs of magnetic poles, each including a north pole and a south pole, are arranged, by using a linear motor.

2. Description of the Related Art

There has been known a mobile body system including a mobile body having a linear motor and a magnetic pole path in which a plurality of pairs of magnetic poles, each including a north pole and a south pole, are arranged. In this kind of mobile body system, the linear motor is driven by magnetic interaction with a magnetic flux of the magnetic pole path, and the mobile body thereby moves along the magnetic pole path.

Meanwhile, in this kind of mobile body system, a magnetic pole path may have a magnetic pole missing section in which the magnetic pole is missing.

In this respect, there exists a mobile body system in which a mobile body includes two linear motors, two magnet absence detecting sensors (e.g., photo sensors) respectively corresponding to the two linear motors, and two position detecting sensors (e.g., Hall elements) respectively corresponding to the two linear motors. In this mobile body, when one magnet absence detecting sensor detects one linear motor being located in the magnetic pole missing section, switching is made to the other linear motor, to enable continuous driving. Further, in this mobile body, when one position detecting sensor detects one linear motor being located in the magnetic pole missing section, switching is made to the other position detecting sensor, to enable continuous position detection for the mobile body.

Meanwhile, in this kind of mobile body, the magnet absence detecting sensor and the linear motor are offset in a path direction of the magnetic pole path, thus making it difficult for the magnet absence detecting sensor to detect every state of the linear motor being located in the magnetic pole missing section. In particular, when the mobile body is started while the linear motor is located in the magnetic pole missing section, it is not possible to detect the linear motor being located in the magnetic pole missing section, which results in a decrease in thrust of the linear motor and generation of thrust in a reverse direction.

BRIEF SUMMARY OF THE INVENTION

Therefore, it is an object of the present invention to provide a mobile body capable of estimating that a linear motor is located in a magnetic pole missing section on a magnetic pole path.

A mobile body according to a first aspect of the present invention is configured as follows. The mobile body moves along a magnetic pole path having a magnetic pole section in which a plurality of pairs of magnetic poles, each including a north pole and a south pole, are arranged, and a magnetic pole missing section in which the magnetic pole is missing. The mobile body includes a plurality of linear motors, a first detector, a second detector, and an estimator. The plurality of linear motors include a first linear motor that is driven by magnetic interaction with a magnetic flux of the magnetic pole path. The first detector is disposed on one side with respect to the first linear motor in a path direction of the magnetic pole path, and detects a first phase angle in accordance with the magnetic flux of the magnetic pole path. The second detector is disposed on the other side with respect to the first linear motor in the path direction of the magnetic pole path, and detects a second phase angle in accordance with the magnetic flux of the magnetic pole path. The estimator compares a phase difference between the first phase angle and the second phase angle with a reference phase difference, to estimate whether or not the first linear motor is located in the magnetic pole missing section.

A mobile body system according to a second aspect of the present invention is configured as follows. The mobile body system includes a magnetic pole path, a mobile body, and an estimator. The magnetic pole path has a magnetic pole section in which a plurality of pairs of magnetic poles, each including a north pole and a south pole, are arranged, and a magnetic pole missing section in which the magnetic pole is missing. The mobile body moves along the magnetic pole path, and includes a plurality of linear motors, a first detector, and a second detector. The plurality of linear motors include a first linear motor that is driven by magnetic interaction with a magnetic flux of the magnetic pole path. The first detector is disposed on one side with respect to the first linear motor in a path direction of the magnetic pole path, and detects a first phase angle in accordance with the magnetic flux of the magnetic pole path. The second detector is disposed on the other side with respect to the first linear motor in the path direction of the magnetic pole path, and detects a second phase angle in accordance with the magnetic flux of the magnetic pole path. The estimator compares a phase difference between the first phase angle and the second phase angle with a reference phase difference, to estimate whether or not the first linear motor is located in the magnetic pole missing section.

For example, the phase difference between the first phase angle detected by the first detector and the second phase angle detected by the second detector at the time when the magnetic pole missing section exists between the first detector and the second detector is different from that at the time when the magnetic pole missing section does not exist therebetween. In other words, the phase difference between the first phase angle detected by the first detector and the second phase angle detected by the second detector at the time when the first linear motor is located in the magnetic pole missing section is different from that at the time when the first linear motor is not located therein.

According to the above mobile body and the mobile body system, it is possible to estimate whether or not the linear motor is located in the magnetic pole missing section on the magnetic pole path.

The present invention is preferably configured as follows. There may be further provided a receptor for accepting a start signal of the mobile body. When the receptor accepts the start signal and the mobile body is started, the estimator may estimate whether or not the first linear motor is located in the magnetic pole missing section.

Accordingly, even when the mobile body is started while the linear motor is located in the magnetic pole missing section, it is possible to reduce a decrease in thrust of the linear motor, or generation of thrust in the reverse direction, caused by the first linear motor being located in the magnetic pole missing section.

The present invention is preferably configured as follows. In a stopped state where the mobile body is stopped, the estimator may estimate whether or not the first linear motor is located in the magnetic pole missing section.

Accordingly, even when the mobile body is stopped and moved again while the linear motor is located in the magnetic pole missing section, it is possible to reduce a decrease in thrust of the linear motor, or generation of thrust in the reverse direction, caused by the first linear motor being located in the magnetic pole missing section.

The present invention is preferably configured as follows. When the phase difference between the first phase angle and the second phase angle is deviated from the reference phase difference, the estimator may estimate that the first linear motor is located in the magnetic pole missing section.

The present invention is preferably configured as follows. The estimator may estimate a distance of the magnetic pole missing section based on an amount of deviation of the phase difference from the reference phase difference.

The present invention is preferably configured as follows. When the mobile body moves in the magnetic pole missing section while a section length of the magnetic pole missing section is in a predetermined range with a distance of the pair of magnetic poles taken as a reference, the first linear motor may be driven in the reverse direction to an original thrust direction, the mobile body may further include a storage unit for storing a threshold that is a reference value to identify whether or not the section length of the magnetic pole missing section is in or out of the predetermined range, and the estimator may compare the amount of deviation of the phase difference from the reference phase difference with the threshold stored in the storage unit, to estimate whether or not the magnetic pole missing section has a length with which the first linear motor is driven in the reverse direction to the original thrust direction.

Accordingly, the interposition of the magnetic pole missing section enables determination that the first linear motor is in a magnetic pole environment in which the first linear motor is driven in the reverse direction to the original thrust direction.

The present invention is preferably configured as follows. There may be further provided a storage unit for previously storing, as the reference phase difference, a phase difference between the first phase angle detected by the first detector and the second phase angle detected by the second detector, the phase difference at the time when the first linear motor is located in the magnetic pole section.

The above and other elements, features, steps, characteristics and advantages of the present invention will become more apparent from the following detailed description of the preferred embodiments with reference to the attached drawings.

DETAILED DESCRIPTION OF PREFERRED EMBODIMENTS

Hereinafter, a preferred embodiment of the present invention will be described in detail with reference to the drawings. The same reference numerals are denoted on the same or corresponding portions throughout the drawings.

1. Configuration of Mobile Body System 1

Figure 1:
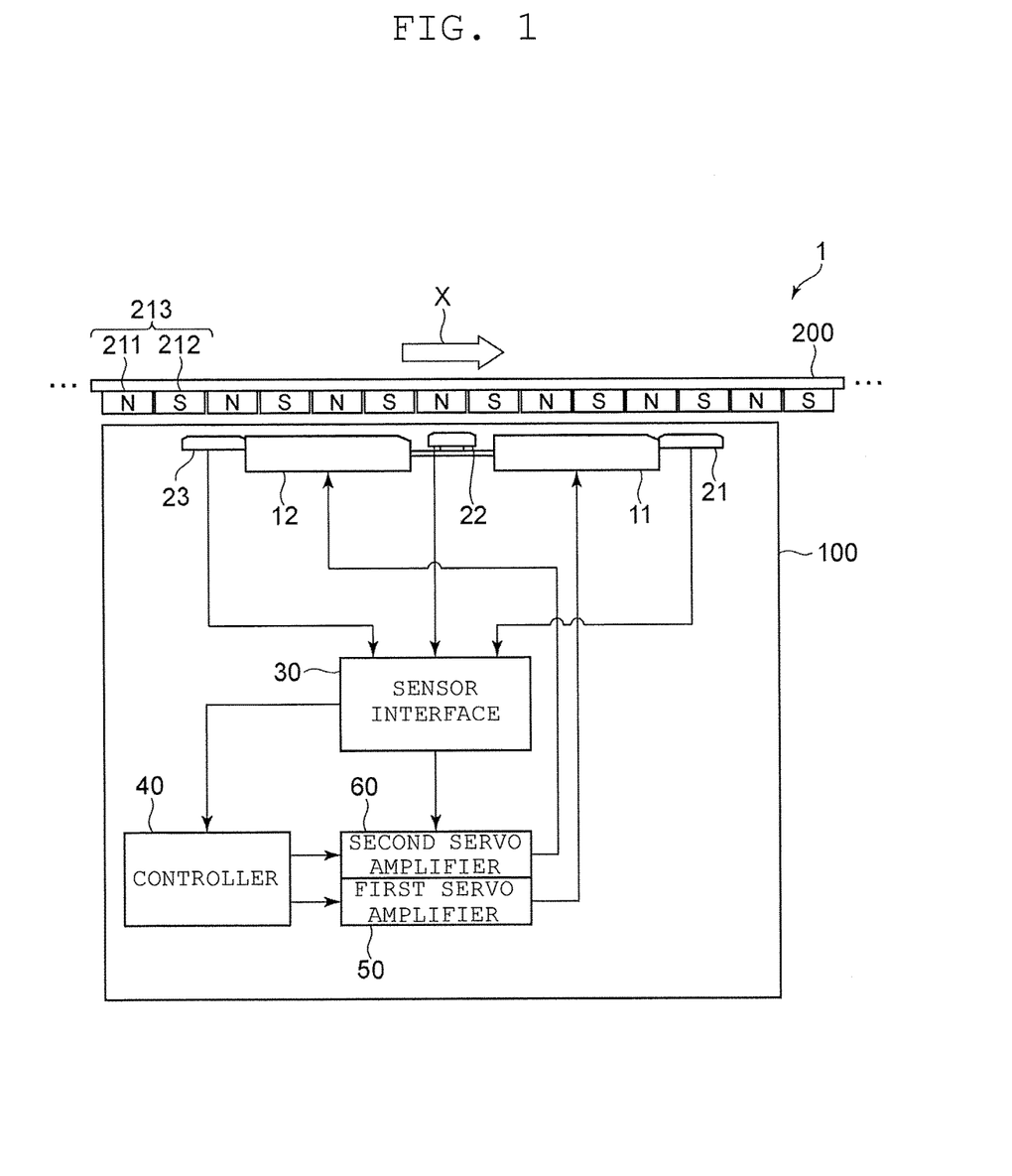
FIG. 1 is a diagram illustrating a mobile body system according to one embodiment and a mobile body according to one embodiment of the present invention.

FIG. 1 is a diagram illustrating a mobile body system according to one embodiment and a mobile body according to one embodiment of the present invention. A mobile body system 1 illustrated in FIG. 1 includes a mobile body 100 and a magnetic pole path 200.

On the magnetic pole path 200, north pole magnets 211 and south pole magnets 212 are alternately disposed at a predetermined pitch (e.g., 33 mm) in a line. In other words, a plurality of pairs of magnetic poles 213, each including a north pole and a south pole, are arranged on the magnetic pole path 200. The mobile body 100 moves along the magnetic pole path 200 by using a linear motor.

One example of the mobile body system 1 is an overhead travelling vehicle system in which a transport vehicle (mobile body) 100 travels along a rail (magnetic pole path) 200 installed on the ceiling. In this kind of mobile body system 1, the rail 200 may have a length of several km, and the number of transport vehicles 100 may be 300 to 400. The mobile body may be a transport vehicle travelling on the ground, or may not be a transport vehicle. For example, the mobile body may be any vehicle other than the transport vehicle, a robot arm, or the like.

Figure 3:
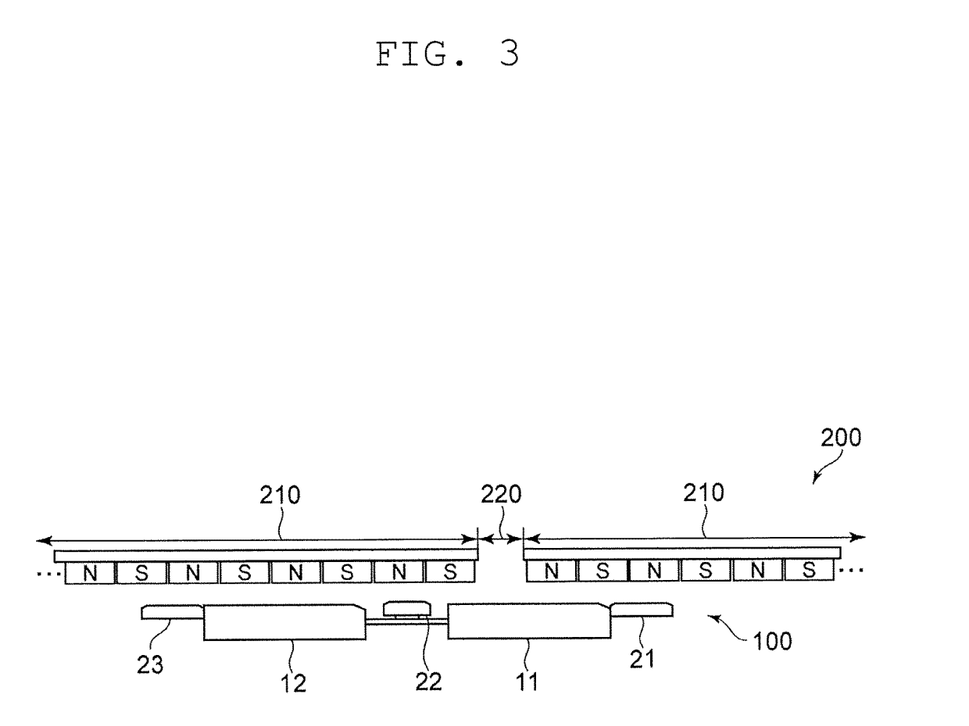
FIG. 3 is a diagram illustrating a main part of the mobile body when a first linear motor is located in a magnetic pole missing section.

In this kind of mobile body system, the length of the magnetic pole path variously changes depending on layout of a factory, for example, and it is not necessarily an integral multiple of a predetermined pitch (e.g., 33 mm). Further, at a junction of a linear path and a curve path on the magnetic pole path, it is difficult to arrange the magnets at the above predetermined pitch (e.g., 33 mm). For these reasons, as illustrated in FIG. 3, the magnetic pole path 200 has a magnetic pole section 210 in which a plurality of pair of magnetic poles 213 are arranged at a predetermined pitch (e.g., 66 mm), and a magnetic pole missing section 220 in which the magnetic pole is missing.

2. Configuration of Mobile Body 100

Figure 2:
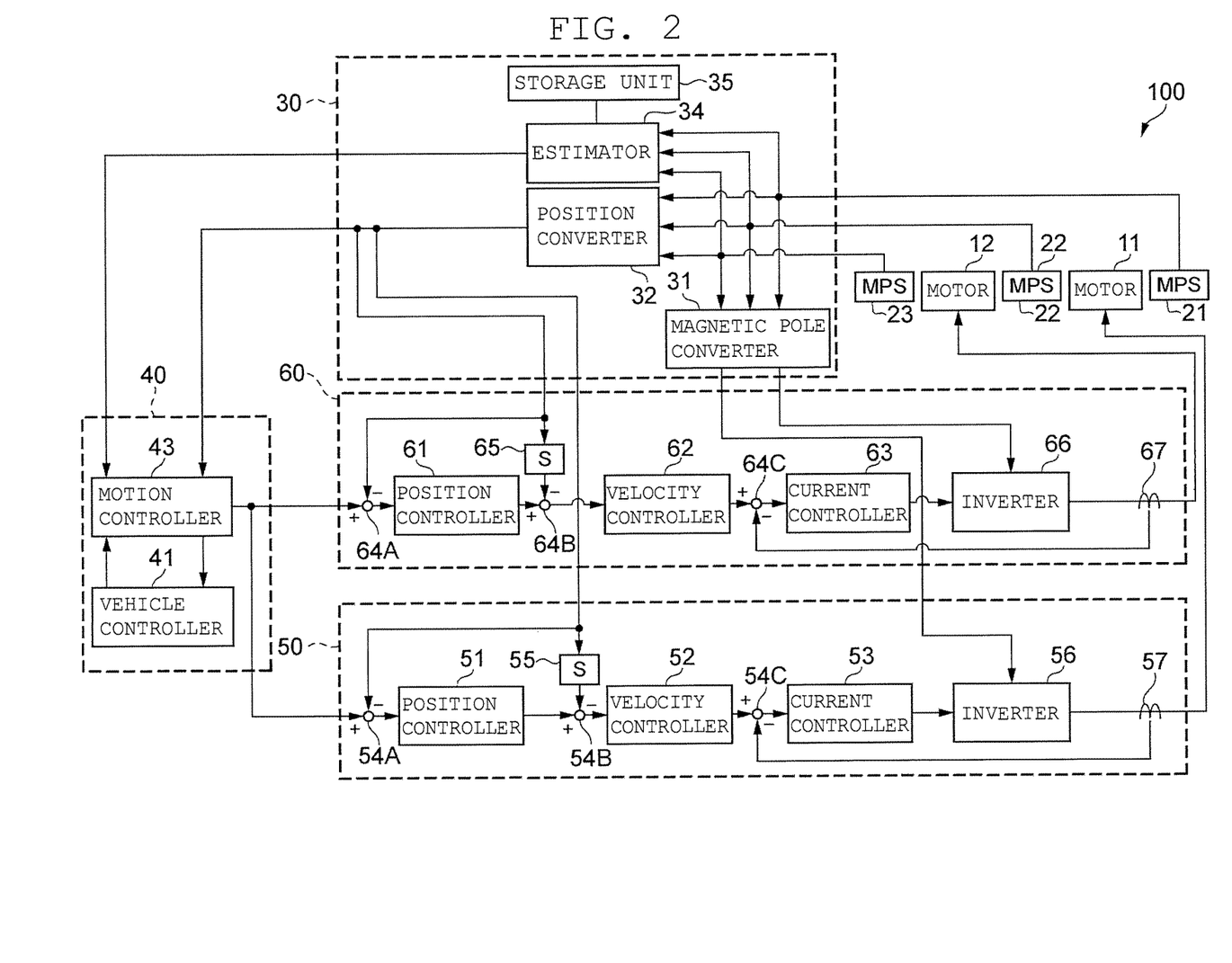
FIG. 2 is a diagram illustrating the mobile body in the mobile body system illustrated in FIG. 1.

FIG. 2 is a diagram illustrating the mobile body in the mobile body system illustrated in FIG. 1. The mobile body 100 illustrated in FIGS. 1 and 2 includes first and second linear motors 11, 12, first, second, and third magnetic pole sensors 21, 22, 23, a sensor interface 30, a controller 40, and first and second servo amplifiers 50, 60. In the present embodiment, the first magnetic pole sensor 21, the first linear motor 11, the second magnetic pole sensor 22, the second linear motor 12, and the third magnetic pole sensor 23 are disposed sequentially from the upstream side of a moving direction X of the mobile body 100.

In the present embodiment, with respect to the first linear motor 11, the first and second magnetic pole sensors 21, 22 respectively correspond to the first and second detectors in the claims. With respect to the second linear motor 12, the third and second sensors 23, 22 respectively correspond to the first and second detectors in the claims. Note that the first and second detectors may be any sensors that sandwich each linear motor. For example, with respect to the first linear motor 11, the first and third magnetic pole sensors 21, 23 may be the first and second detectors. Similarly, with respect to the second linear motor 12, the first and third magnetic pole sensors 21, 23 may be the first and second detectors.

3. Configurations of First and Second Linear Motors 11, 12

Each of the first and second linear motors 11, 12 is a three-phase linear motor, for example, and is driven by magnetic interaction with a magnetic flux of the magnetic pole path 200. A magnetic field of the first linear motor 11 is controlled by an AC drive current from the first servo amplifier 50, and a magnetic field of the second linear motor 12 is controlled by an AC drive current from the second servo amplifier 60. The first linear motor 11 and the second linear motor 12 are disposed in different positions in the moving direction X of the mobile body 100 (the path direction of the magnetic pole path 200).

4. Configurations of First to Third Magnetic Pole Sensors 21 to 23

The first magnetic pole sensor 21 is a magnetic pole sensor (MPS) for detecting the magnetic pole of the magnetic pole path 200, and includes a Hall element, for example. With such a configuration, the first magnetic pole sensor 21 detects a phase angle (a first phase angle) in accordance with the magnetic flux of the magnetic pole path 200, with a pair of magnetic poles 213 including the north pole and the south pole taken as one cycle. Since the phase angle detected by this magnetic pole sensor is used for an electrical angle of the first linear motor 11 as described later, this magnetic pole sensor is referred to as a first electrical angle detecting sensor.

Similarly, the third magnetic pole sensor 23 is a magnetic pole sensor (MPS) for detecting the magnetic pole of the magnetic pole path 200, and includes a Hall element, for example. With such a configuration, the third magnetic pole sensor 23 detects a phase angle (a first phase angle) in accordance with the magnetic flux of the magnetic pole path 200, with a pair of magnetic poles 213 including the north pole and the south pole taken as one cycle. Since the phase angle detected by this magnetic pole sensor is used for an electrical angle of the second linear motor 12 as described later, this magnetic pole sensor is referred to as a second electrical angle detecting sensor.

Further, the second magnetic pole sensor 22 is a magnetic pole sensor (MPS) for detecting the magnetic pole of the magnetic pole path 200, and includes a Hall element, for example. With such a configuration, the second magnetic pole sensor 22 detects a phase angle (a second phase angle) in accordance with the magnetic flux of the magnetic pole path 200, with a pair of magnetic poles 213 including the north pole and the south pole taken as one cycle. Since the phase angle detected by this magnetic pole sensor is used for detecting the position of the mobile body 100 as described later, this magnetic pole sensor is referred to as a position detecting sensor.

Each of the first, second, and third magnetic pole sensors 21, 22, 23 has a function of determining whether or not it is located in the magnetic pole missing section 220 based on the detected magnetic flux of the magnetic pole path 200. When it is not located in the magnetic pole missing section 220, each of the first, second, and third magnetic pole sensors 21, 22, 23 outputs a signal (validation) indicating that the output is in a valid state. When it is located in the magnetic pole missing section, each of the first, second, and third magnetic pole sensors 21, 22, 23 outputs a signal (validation) indicating that the output is in an invalid state.

The first magnetic pole sensor 21, the second magnetic pole sensor 22, and the third magnetic pole sensor 23 are disposed in different positions in the moving direction X of the mobile body 100 (the path direction of the magnetic pole path 200). Specifically, the first magnetic pole sensor 21 is disposed on one side with respect to the first linear motor 11 in the moving direction X of the mobile body 100 (the path direction of the magnetic pole path 200), and the second magnetic pole sensor 22 is disposed on the other side with respect to the first linear motor 11 in the moving direction X of the mobile body 100 (the path direction of the magnetic pole path 200). That is, the first magnetic pole sensor 21 and the second magnetic pole sensor 22 are disposed so as to sandwich the first linear motor 11 in the moving direction X of the mobile body 100 (the path direction of the magnetic pole path 200). Further, the second magnetic pole sensor 22 is disposed on one side with respect to the second linear motor 12 in the moving direction X of the mobile body 100 (the path direction of the magnetic pole path 200), and the third magnetic pole sensor 23 is disposed on the other side with respect to the second linear motor 12 in the moving direction X of the mobile body 100 (the path direction of the magnetic pole path 200). That is, the second magnetic pole sensor 22 and the third magnetic pole sensor 23 are disposed so as to sandwich the second linear motor 12 in the moving direction X of the mobile body 100 (the path direction of the magnetic pole path 200).

5. Configuration of Sensor Interface 30

The sensor interface 30 includes a magnetic pole converter 31, a position converter 32, an estimator 34, and a storage unit 35.

The magnetic pole converter 31 derives an electrical angle (a magnetic pole) of a magnetic field of the first linear motor 11 for obtaining thrust by magnetic interaction, namely, an electrical angle of a drive current of the first linear motor 11, based on the phase angle outputted by the first magnetic pole sensor 21. Specifically, the magnetic pole converter 31 adds an offset angle in accordance with a distance between the first linear motor 11 and the first magnetic pole sensor 21 to the phase angle outputted by the first magnetic pole sensor 21, and takes the obtained angle as the electrical angle of the first linear motor 11. The magnetic pole converter 31 supplies the first servo amplifier 50 with the derived electrical angle (magnetic pole) of the first linear motor 11.

Similarly, the magnetic pole converter 31 derives an electrical angle (a magnetic pole) of a magnetic field of the second linear motor 12 for obtaining thrust by magnetic interaction, namely, an electrical angle of a drive current of the second linear motor 12, based on the phase angle outputted by the third magnetic pole sensor 23. Specifically, the magnetic pole converter 31 adds an offset angle in accordance with a distance between the second linear motor 12 and the third magnetic pole sensor 23 to the phase angle outputted by the third magnetic pole sensor 23, and takes the obtained angle as the electrical angle of the second linear motor 12. The magnetic pole converter 31 supplies the second servo amplifier 60 with the derived electrical angle (magnetic pole) of the second linear motor 12.

The position converter 32 derives a position of the mobile body 100 based on a phase angle outputted by the second magnetic pole sensor 22 and a predetermined pitch length (e.g., 66 mm) of the pair of magnetic poles 213. The position converter 32 supplies the derived position of the mobile body 100 to the controller 40 and the first and second servo amplifiers 50, 60. Further, the position converter 32 supplies the controller 40 with the signals (validations) received from the first, second, and third magnetic pole sensors 21, 22, 23 and indicating the valid/invalid state.

When the first linear motor 11 is located in the magnetic pole section 210, the estimator 34 previously measures a phase difference F−M between a first phase angle F detected by the first magnetic pole sensor 21 and a second phase angle M detected by the second magnetic pole sensor 22. The measured phase difference F−M is previously stored in the storage unit 35 as a reference phase difference.

Further, when the first linear motor 11 is located in the magnetic pole missing section 220 with a distance of a quarter pitch with respect to a distance of one pitch of the pair of magnetic poles 213, the estimator 34 previously measures a phase difference between a first phase angle detected by the first magnetic pole sensor 21 and a second phase angle detected by the second magnetic pole sensor 22, and calculates an amount of deviation of the measured phase difference from the reference phase difference. The obtained amount of deviation is previously stored in the storage unit 35 as a threshold.

When the original thrust cannot be obtained by the linear motor due to the existence of the magnetic pole missing section on the linear motor, thrust F of the linear motor can be represented by approximately F×cos θ, where θ is a phase angle corresponding to a distance of the magnetic pole missing section (i.e., an error of an electrical angle due to the distance of the magnetic pole missing section). It is thereby found that the thrust F decreases when 0<θ<90° and 270°<θ<360°, the thrust F becomes zero when θ=90°, 270°, and reverse thrust F is generated when 90°<θ<270°. That is, the above threshold is a threshold as to whether or not the reverse thrust F is generated. Note that this matters little when the length of the magnetic pole missing section is the same as the pitch length of the pair of magnetic poles.

The estimator 34 then compares, with the reference phase difference F−M, a phase difference F'−M' between a first phase angle F' detected by the first magnetic pole sensor 21 and a second phase angle M' detected by the second magnetic pole sensor 22 at the present positions, to estimate whether or not the first linear motor 11 is located in the magnetic pole missing section 220. When the phase difference F'−M' between the first phase angle F' and the second phase angle M' at the present positions is deviated from the reference phase difference F−M, the estimator 34 estimates that the first linear motor 11 is located in the magnetic pole missing section 220.

Further, the estimator 34 compares, with the above threshold, an amount of deviation (an absolute value) |(F'−M')−(F−M)| of the phase difference F'−M' between the first phase angle F' and the second phase angle M' at the present positions from the reference phase difference F−M, to estimate whether or not the distance of the magnetic pole missing section 220 is a quarter pitch. When the distance of the magnetic pole missing section 220 is a quarter pitch or larger, the estimator 34 supplies the controller 40 with a signal (magnet-less status) indicating a magnet missing state where the first linear motor 11 is located in the magnetic pole missing section 220 and reverse thrust is generated.

Further, the estimator 34 may estimate the distance of the magnetic pole missing section 220 based on an amount of deviation (F'−M')−(F−M) of the phase difference F'−M' between the first phase angle F' and the second phase angle M' at the present positions from the reference phase difference F−M.

The estimator 34 performs the above estimation at the start of the mobile body 100, for example, when a vehicle controller (receptor) 41 in the controller 40 described later accepts a start signal from a host controller (not illustrated) and the mobile body 100 is started. Note that the estimator 34 may perform the above estimation in a stopped state where the mobile body 100 is stopped after being started.

Similarly, when the second linear motor 12 is located in the magnetic pole section 210, the estimator 34 previously measures a phase difference F−M between a first phase angle F detected by the third magnetic pole sensor 23 and a second phase angle M detected by the second magnetic pole sensor 22. The measured phase difference F−M is previously stored in the storage unit 35 as a reference phase difference.

Further, when the second linear motor 12 is located in the magnetic pole missing section 220 with a distance of a quarter pitch with respect to a distance of one pitch of the pair of magnetic poles 213, the estimator 34 previously measures a phase difference between a first phase angle detected by the third magnetic pole sensor 23 and a second phase angle detected by the second magnetic pole sensor 22, and calculates an amount of deviation of the measured phase difference from the reference phase difference. The obtained amount of deviation is previously stored in the storage unit 35 as a threshold.

The estimator 34 then compares, with the reference phase difference F−M, a phase difference F'−M' between a first phase angle F' detected by the third magnetic pole sensor 23 and a second phase angle M' detected by the second magnetic pole sensor 22 at the present positions, to estimate whether or not the second linear motor 12 is located in the magnetic pole missing section 220. When the phase difference F'−M' between the first phase angle F' and the second phase angle M' at the present positions is deviated from the reference phase difference F−M, the estimator 34 estimates that the second linear motor 12 is located in the magnetic pole missing section 220.

Further, the estimator 34 compares, with the above threshold, an amount of deviation (an absolute value) |(F'−M')−(F−M)| of the phase difference F'−M' between the first phase angle F' and the second phase angle M' at the present positions from the reference phase difference F−M, to estimate whether or not the distance of the magnetic pole missing section 220 is a quarter pitch. When the distance of the magnetic pole missing section 220 is a quarter pitch or larger, the estimator 34 supplies the controller 40 with a signal (magnet-less status) indicating a magnet missing state where the second linear motor 12 is located in the magnetic pole missing section 220 and reverse thrust is generated.

Further, the estimator 34 may estimate the distance of the magnetic pole missing section 220 based on an amount of deviation (F'−M')−(F−M) of the phase difference F'−M' between the first phase angle F' and the second phase angle M' at the present positions from the reference phase difference F−M.

The estimator 34 performs the above estimation at the start of the mobile body 100, for example, when the vehicle controller (receptor) 41 in the controller 40 described later accepts a start signal from the host controller (not illustrated) and the mobile body 100 is started. Note that the estimator 34 may perform the above estimation in a stopped state where the mobile body 100 is stopped after being started.

6. Configuration of Controller 40

The controller 40 includes the vehicle controller 41 and a motion controller 43. Note that the vehicle controller 41 functions as the receptor described in the claims.

The vehicle controller 41 acquires drive control information of the mobile body, such as a target position, a target velocity, and a target stop-distance, from the host controller (not illustrated), and previously stores the information. The vehicle controller 41 supplies these pieces of information to the motion controller 43.

Further, the vehicle controller 41 functions as the receptor and accepts a start signal for starting the mobile body 100 from the host controller (not illustrated), to control starting of each unit in the mobile body 100 based on this start signal.

When a valid state signal (validation) of the first magnetic pole sensor 21 is received from the position converter 32 and a magnetic pole missing state (magnet-less status) signal of the first linear motor 11 is not received from the estimator 34, the motion controller 43 supplies the first servo amplifier 50 with a position command (command position) for reaching a command position based on the present position information (position) from the position converter 32. On the other hand, when an invalid state signal (validation) of the first magnetic pole sensor 21 is received from the position converter 32 or a magnetic pole missing state (magnet-less status) signal of the first linear motor 11 is received from the estimator 34, the motion controller 43 stops the supply of the position command (command position) to the first servo amplifier 50.

Similarly, when a valid state signal (validation) of the third magnetic pole sensor 23 is received from the position converter 32 and a magnetic pole missing state (magnet-less status) signal of the second linear motor 12 is not received from the estimator 34, the motion controller 43 supplies the second servo amplifier 60 with a position command (command position) for reaching a command position based on the present position information (position) from the position converter 32. On the other hand, when an invalid state signal (validation) of the third magnetic pole sensor 23 is received from the position converter 32 or a magnetic pole missing state (magnet-less status) signal of the second linear motor 12 is received from the estimator 34, the motion controller 43 stops the supply of the position command (command position) to the second servo amplifier 60.

7. Configurations of First and Second Servo Amplifiers 50, 60

The first servo amplifier 50 has a position controller 51, a velocity controller 52, a current controller 53, subtractors 54A, 54B, 54C, a differentiator 55, an inverter 56, and a current sensor 57.

The position controller 51 receives input of data (position difference data) obtained by the subtractor 54A calculating a difference between the target position indicated by the position command from the motion controller 43 and the present position indicated by the position information from the position converter 32. The position controller 51 outputs velocity data in accordance with this position difference data.

The velocity controller 52 receives input of data (velocity difference data) obtained by the differentiator 55 differentiating the position information from the position converter 32 and by the subtractor 54B calculating a difference between this differentiation data and the velocity data from the position controller 51. The velocity controller 52 outputs current value data in accordance with this velocity difference data.

The current controller 53 receives input of data (current value difference data) obtained by the current sensor 57 detecting the present current value of the first linear motor 11 and by the subtractor 54C calculating a difference between the current value data from the velocity controller 52 and feedback data in accordance with the present current value (the actual current value) from the current sensor 57. The current controller 53 outputs a DC drive current in accordance with this current value difference data.

The inverter 56 converts the DC drive current from the current controller 53 to an AC drive current based on the electrical angle of the first linear motor from the magnetic pole converter 31, to generate a drive current for driving the first linear motor. One example of the inverter 56 is a three-phase inverter using an intelligent power module (IPM).

Similarly, the second servo amplifier 60 has a position controller 61, a velocity controller 62, a current controller 63, subtractors 64A, 64B, 64C, a differentiator 65, an inverter 66, and a current sensor 67.

The position controller 61 receives input of data (position difference data) obtained by the subtractor 64A calculating a difference between the target position indicated by the position command from the motion controller 43 and the present position indicated by the position information from the position converter 32. The position controller 61 outputs velocity data in accordance with this position difference data.

The velocity controller 62 receives input of data (velocity difference data) obtained by the differentiator 65 differentiating position information from the position converter 32 and by the subtractor 64B calculating a difference between this differentiation data and the velocity data from the position controller 61. The velocity controller 62 outputs current value data in accordance with this velocity difference data.

The current controller 63 receives input of data (current value difference data) obtained by the current sensor 67 detecting the present current value of the second linear motor 12 and by the subtractor 64C calculating a difference between the current value data from the velocity controller 62 and feedback data in accordance with the present current value (the actual current value) from the current sensor 67. The current controller 63 outputs a DC drive current in accordance with this current value difference data.

The inverter 66 converts the DC drive current from the current controller 63 to an AC drive current based on the electrical angle of the second linear motor from the magnetic pole converter 31, to generate a drive current for driving the second linear motor. One example of the inverter 66 is a three-phase inverter using an intelligent power module (IPM).

8. Operations of Mobile Body System 1 and Mobile Body 100

Next, the operation of the mobile body 100 of the present embodiment will be described. First, based on signals (validations) received from the first and second magnetic pole sensors 21, 22 and indicating the valid/invalid state, it is determined whether or not the first and second magnetic pole sensors 21, 22 are located in the magnetic pole missing section 220. When the first and second magnetic pole sensors 21, 22 are not located in the magnetic pole missing section 220, the estimator estimates whether or not the first linear motor 11 is located in the magnetic pole missing section 220 based on the output from the first and second magnetic pole sensors 21, 22. When the first linear motor 11 is not located in the magnetic pole missing section 220, the controller 40 and the first servo amplifier 50 drive the first linear motor 11.

On the other hand, when the first magnetic pole sensor 21 is located in the magnetic pole missing section 220 (the invalid state signal) or when the first linear motor 11 is located in the magnetic pole missing section 220 (the magnetic pole missing state signal), based on signals (validations) received from the second and third magnetic pole sensors 22, 23 and indicating the valid/invalid state, it is determined whether or not the second and third magnetic pole sensors 22, 23 are located in the magnetic pole missing section 220. When the second and third magnetic pole sensors 22, 23 are not located in the magnetic pole missing section 220, the estimator estimates whether or not the second linear motor 12 is located in the magnetic pole missing section 220 based on the output from the second and third magnetic pole sensors 22, 23. When the second linear motor 12 is not located in the magnetic pole missing section 220, the controller 40 and the second servo amplifier 60 drive the second linear motor 12.

As described above, according to the mobile body 100 of the present embodiment, it is possible to estimate whether or not the linear motor is located in the magnetic pole missing section on the magnetic pole path. In particular, when the mobile body is started while the linear motor is located in the magnetic pole missing section and also when the mobile body is stopped and moved again while the linear motor is located in the magnetic pole missing section, it is possible to reduce a decrease in thrust of the linear motor, or generation of thrust in the reverse direction, which is caused by the linear motor being located in the magnetic pole missing section.

9. Alternative Embodiments

The present invention is not limited to the present embodiment described above, and various modifications are possible. For example, in the present embodiment, the estimator 34 uses the threshold corresponding to the magnetic pole missing section 220 with a quarter pitch, namely, the threshold at the level where the reverse thrust F is generated. However, there may be used a threshold corresponding to the magnetic pole missing section 220 with a pitch smaller than a quarter pitch, namely, a threshold at a level where the thrust F decreases.

In such a manner, adjusting the threshold enables not only estimation of generation of thrust in the reverse direction, but also estimation of a decrease in thrust. Further, as the threshold for determining generation of thrust in the reverse direction, the estimator 34 may add a margin, obtained considering a detection error of the magnetic pole sensor, to the threshold corresponding to the magnetic pole missing section 220 with a quarter pitch.

Moreover, although the mobile body having two linear motors has been illustrated in the present embodiment, the mobile body may have three or more linear motors.

Furthermore, although the mobile body 100 is configured to include the estimator 34 in the present embodiment, the estimator 34 may be provided outside the mobile body 100, and for example, it may be provided in a ground-side controller (not illustrated) which can be communicated with the mobile body 100 and disposed on the ground. In this case, the mobile body 100 transmits detection information concerning the first to third magnetic pole sensors 21 to 23 (phase angles of the respective sensors, a phase difference between the magnetic pole sensors, etc.) to the ground-side controller, and the ground-side controller executes the function of the estimator 34 based on the received detection information. Then, the ground-side controller may transmit a command based on an execution result (stop command, retreat command, slow-down command, etc.) to the mobile body 100, to control the mobile body 100.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A mobile body that moves along a magnetic pole path having a magnetic pole section in which a plurality of pairs of magnetic poles, each including a north pole and a south pole, are arranged, and a magnetic pole missing section in which the magnetic pole is missing, the mobile body comprising:
    a plurality of linear motors including a first linear motor that is driven by magnetic interaction with a magnetic flux of the magnetic pole path;
    a first detector which is disposed on one side with respect to the first linear motor in a path direction of the magnetic pole path, and detects a first phase angle in accordance with the magnetic flux of the magnetic pole path;
    a second detector which is disposed on the other side with respect to the first linear motor in the path direction of the magnetic pole path, and detects a second phase angle in accordance with the magnetic flux of the magnetic pole path; and
    an estimator which compares a phase difference between the first phase angle and the second phase angle with a reference phase difference, to estimate whether or not the first linear motor is located in the magnetic pole missing section.

2. The mobile body according to claim 1, further comprising a receptor for accepting a start signal of the mobile body,
    wherein, when the receptor accepts the start signal and the mobile body is started, the estimator estimates whether or not the first linear motor is located in the magnetic pole missing section.

3. The mobile body according to claim 1, wherein
    in a stopped state where the mobile body is stopped, the estimator estimates whether or not the first linear motor is located in the magnetic pole missing section.

4. The mobile body according to claim 1, wherein
    when the phase difference between the first phase angle and the second phase angle is deviated from the reference phase difference, the estimator estimates that the first linear motor is located in the magnetic pole missing section.

5. The mobile body according to claim 4, wherein
    the estimator estimates a distance of the magnetic pole missing section based on an amount of deviation of the phase difference from the reference phase difference.

6. The mobile body according to claim 4, wherein
    when the mobile body moves in the magnetic pole missing section in a case where a section length of the magnetic pole missing section is in a predetermined range with a distance of the pair of magnetic poles taken as a reference, the first linear motor is driven in a reverse direction to an original thrust direction,
    the mobile body further comprises a storage unit for storing a threshold that is a reference value to identify whether or not the section length of the magnetic pole missing section is in or out of the predetermined range, and
    the estimator compares an amount of deviation of the phase difference from the reference phase difference with the threshold stored in the storage unit, to estimate whether or not the magnetic pole missing section has a length with which the first linear motor is driven in the reverse direction to the original thrust direction.

7. The mobile body according to claim 1, further comprising a storage unit for previously storing, as the reference phase difference, a phase difference between the first phase angle detected by the first detector and the second phase angle detected by the second detector, the phase difference at the time when the first linear motor is located in the magnetic pole section.

8. A mobile body system comprising:
a magnetic pole path having a magnetic pole section in which a plurality of pairs of magnetic poles, each including a north pole and a south pole, are arranged, and a magnetic pole missing section in which the magnetic pole is missing;
a mobile body which moves along the magnetic pole path, the mobile body including
a plurality of linear motors including a first linear motor that is driven by magnetic interaction with a magnetic flux of the magnetic pole path,
a first detector which is disposed on one side with respect to the first linear motor in a path direction of the magnetic pole path, and detects a first phase angle in accordance with the magnetic flux of the magnetic pole path, and
a second detector which is disposed on the other side with respect to the first linear motor in the path direction of the magnetic pole path, and detects a second phase angle in accordance with the magnetic flux of the magnetic pole path; and
an estimator which compares a phase difference between the first phase angle and the second phase angle with a reference phase difference, to estimate whether or not the first linear motor is located in the magnetic pole missing section.

9. The mobile body system according to claim 8, further comprising a receptor for accepting a start signal of the mobile body,
wherein, when the receptor accepts the start signal and the mobile body is started, the estimator estimates whether or not the first linear motor is located in the magnetic pole missing section.

10. The mobile body system according to claim 8, wherein
in a stopped state where the mobile body is stopped, the estimator estimates whether or not the first linear motor is located in the magnetic pole missing section.

11. The mobile body system according to claim 8, wherein
when the phase difference between the first phase angle and the second phase angle is deviated from the reference phase difference, the estimator estimates that the first linear motor is located in the magnetic pole missing section.

12. The mobile body system according to claim 11, wherein the estimator estimates a distance of the magnetic pole missing section based on an amount of deviation of the phase difference from the reference phase difference.

13. The mobile body system according to claim 11, wherein
when the mobile body moves in the magnetic pole missing section in a case where a section length of the magnetic pole missing section is in a predetermined range with a distance of the pair of magnetic poles taken as a reference, the first linear motor is driven in a reverse direction to an original thrust direction,
the mobile body system further comprises a storage unit for storing a threshold that is a reference value to identify whether or not the section length of the magnetic pole missing section is in or out of the predetermined range, and
the estimator compares an amount of deviation of the phase difference from the reference phase difference with the threshold stored in the storage unit, to estimate whether or not the magnetic pole missing section has a length with which the first linear motor is driven in the reverse direction to the original thrust direction.

14. The mobile body system according to claim 8, further comprising a storage unit for previously storing, as the reference phase difference, a phase difference between the first phase angle detected by the first detector and the second phase angle detected by the second detector, the phase difference at the time when the first linear motor is located in the magnetic pole section.

* * * * *